US 9,873,435 B2

United States Patent
Miller et al.

(10) Patent No.: US 9,873,435 B2
(45) Date of Patent: Jan. 23, 2018

(54) METHOD AND SYSTEM FOR ENGINE CONTROL

(71) Applicant: Ford Global Technologies, LLC, Dearborn, MI (US)

(72) Inventors: Kenneth James Miller, Canton, MI (US); Thomas G. Leone, Ypsilanti, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/146,809

(22) Filed: May 4, 2016

(65) Prior Publication Data
US 2017/0320498 A1 Nov. 9, 2017

(51) Int. Cl.
*B60W 30/188* (2012.01)
*B60W 10/06* (2006.01)
(Continued)

(52) U.S. Cl.
CPC ........ *B60W 30/1882* (2013.01); *B60W 10/06* (2013.01); *B60W 10/101* (2013.01); *B60W 30/20* (2013.01); *F02D 19/061* (2013.01); *F02D 19/0602* (2013.01); *F02D 19/0615* (2013.01); *F02D 41/2406* (2013.01);
(Continued)

(58) Field of Classification Search
CPC .. F02D 19/06; F02D 19/0613; F02D 41/2406; F02D 41/26; F02D 41/3094
See application file for complete search history.

(56) References Cited

U.S. PATENT DOCUMENTS 3,254,620 A 6/1966 Cannon
3,640,894 A 2/1972 Sampson et al.
(Continued)

FOREIGN PATENT DOCUMENTS

CA 2762747 A1 7/2012
CN 1223335 A 7/1999
(Continued)

OTHER PUBLICATIONS

Hoffmann, W., et al., "A New Approach to Ethanol Utilization: High Efficiency and Low NOx in an Engine Operating on Simulated Reformed Ethanol," SAE Technical Paper 2008-01-2415, Powertrains, Fuels & Lubricants Meeting, Rosemont, IL, Oct. 6-9, 2008, 11 pages.
(Continued)

*Primary Examiner* — Jacob S Scott
*Assistant Examiner* — Tinh Dang
(74) *Attorney, Agent, or Firm* — Julia Voutyras; McCoy Russell LLP

(57) ABSTRACT

Methods and systems are provided for integrating a bi-fuel engine with a CVT transmission. Responsive to a driver demand, a controller may determine whether to maintain usage of a current fuel or transition to an alternate fuel based on the cost efficiency of the transition and further based on any engine limitations that may be incurred at the engine speed-load following the transition. To improve the net fuel economy benefit while addressing the engine limitation, a fuel transition may be combined with a CVT adjusted engine speed-load regime, while maintaining engine power output.

20 Claims, 7 Drawing Sheets

(51) Int. Cl.
| | |
|---|---|
| *B60W 10/101* | (2012.01) |
| *F02D 41/26* | (2006.01) |
| *F02D 41/30* | (2006.01) |
| *F02D 19/06* | (2006.01) |
| *F02M 43/04* | (2006.01) |
| *F02D 41/24* | (2006.01) |
| *B60W 30/20* | (2006.01) |

(52) U.S. Cl.
CPC ......... *F02D 41/26* (2013.01); *F02D 41/3094* (2013.01); *F02M 43/04* (2013.01); *B60W 2030/206* (2013.01); *B60W 2560/06* (2013.01); *B60W 2710/0677* (2013.01); *B60W 2710/10* (2013.01); *B60W 2900/00* (2013.01)

(56) References Cited

U.S. PATENT DOCUMENTS

| | | |
|---|---|---|
| 4,391,716 A | 7/1983 | McCurry |
| 4,505,169 A | 3/1985 | Ganoung |
| 5,237,978 A | 8/1993 | Bailey |
| 5,408,874 A | 4/1995 | Fleck, Sr. et al. |
| 5,785,136 A | 7/1998 | Falkenmayer et al. |
| 5,806,617 A | 9/1998 | Yamaguchi |
| 6,116,363 A | 9/2000 | Frank |
| 6,276,473 B1 | 8/2001 | Zur Megede |
| 6,378,637 B1 | 4/2002 | Ono et al. |
| 6,450,193 B1 | 9/2002 | Constantinou |
| 6,655,324 B2 | 12/2003 | Cohn et al. |
| 6,715,452 B1 | 4/2004 | Taylor, III et al. |
| 6,715,453 B2 | 4/2004 | Tomatsuri et al. |
| 6,796,287 B2 | 9/2004 | Mogi et al. |
| 6,915,766 B2 | 7/2005 | Aoyama et al. |
| 6,929,582 B2 | 8/2005 | Yang et al. |
| 6,970,781 B1 | 11/2005 | Chen et al. |
| 7,213,397 B2 | 5/2007 | Hu et al. |
| 7,258,099 B2 | 8/2007 | Yoshida et al. |
| 7,267,087 B2 | 9/2007 | Glugla |
| 7,295,902 B2 | 11/2007 | Chen et al. |
| 7,426,907 B2 | 9/2008 | Dearth et al. |
| 7,454,285 B2 * | 11/2008 | Christie ................ B60W 10/12 123/1 A |
| 7,703,435 B2 | 4/2010 | Surnilla et al. |
| 7,676,321 B2 | 5/2010 | Andri |
| 7,748,481 B2 | 7/2010 | Holmes et al. |
| 7,805,238 B2 | 9/2010 | Andri |
| 7,826,957 B2 | 11/2010 | Fabien |
| 7,832,511 B2 | 11/2010 | Syed et al. |
| 7,845,315 B2 | 12/2010 | Leone et al. |
| 7,925,418 B2 | 4/2011 | Fabien |
| 8,015,951 B2 | 9/2011 | Dearth et al. |
| 8,050,831 B2 | 11/2011 | Martin et al. |
| 8,065,979 B2 | 11/2011 | Leone et al. |
| 8,118,009 B2 | 2/2012 | Pursifull et al. |
| 8,127,745 B2 | 3/2012 | Surnilla et al. |
| 8,141,356 B2 | 3/2012 | Leone et al. |
| 8,312,867 B2 | 11/2012 | Pursifull et al. |
| 8,375,899 B2 | 2/2013 | Leone et al. |
| 8,387,591 B2 | 3/2013 | Surnilla et al. |
| 8,539,914 B2 | 9/2013 | Kerns et al. |
| 8,550,058 B2 | 10/2013 | Pursifull et al. |
| 8,606,474 B2 | 12/2013 | Guo et al. |
| 8,656,869 B2 | 2/2014 | Leone et al. |
| 8,701,630 B2 | 4/2014 | Surnilla et al. |
| 8,738,255 B2 | 5/2014 | Carter et al. |
| 8,746,189 B2 | 6/2014 | Kawasaki |
| 9,038,613 B2 | 5/2015 | Pursifull et al. |
| 9,157,385 B2 | 10/2015 | Gallagher et al. |
| 9,334,813 B2 * | 5/2016 | Fiveland ............. F02D 19/0626 |
| 9,376,967 B2 | 6/2016 | Springer et al. |
| 9,457,789 B2 * | 10/2016 | Assaf ...................... F02D 13/08 |
| 2004/0188154 A1 | 9/2004 | Carlson |
| 2010/0063658 A1 | 3/2010 | Martin et al. |
| 2011/0029177 A1 | 2/2011 | Yeung et al. |
| 2011/0246010 A1 | 10/2011 | de la Torre Bueno |
| 2013/0055990 A1 | 3/2013 | Kamada |
| 2014/0067540 A1 | 3/2014 | Williams et al. |
| 2014/0116395 A1 | 5/2014 | Blackstock |
| 2014/0202430 A1 | 7/2014 | Monros |
| 2015/0114359 A1 | 4/2015 | Leone et al. |
| 2015/0300830 A1 | 10/2015 | Fisher |

FOREIGN PATENT DOCUMENTS

| | | |
|---|---|---|
| CN | 103291468 A | 9/2013 |
| CN | 104005861 A | 8/2014 |
| CN | 203756344 U | 8/2014 |
| JP | 407019124 A | 1/1995 |
| JP | 2006257907 A | 9/2006 |
| JP | 2007077918 A | 3/2007 |
| NO | 2007027327 A2 | 3/2007 |
| SU | 0731020 | 4/1980 |
| SU | 0848725 | 7/1981 |

OTHER PUBLICATIONS

Kadota, M. et al., "Advanced Control System of Variable Compression Ratio (VCR) Engine with Dual Piston Mechanism," SAE International 2009-01-1063, Apr. 20, 2009, 10 pages.

Wheeler, Jennifer C. et al., "High Efficiency, Low Feedgas NOx, and Improved Cold Start Enabled by Low Temperature Ethanol Reforming," SAE International 2010-01-0621, Apr. 12, 2010, 18 pages.

Wheeler, Jennifer C. et al., "Low-Temperature Ethanol Reforming: A Multi-Cylinder Engine Demonstration," SAE International 2011-01-0142, Apr. 12, 2011, 20 pages.

Kleeberg, Henning et al., "Increasing Efficiency in Gasoline Powertrains with a Two-Stage Variable Compression Ratio (VCR) System," SAE International 2013-01-0288, Apr. 8, 2013, 10 pages.

Morgenstern, David et al., "Integration of an E85 Reforming System into a Vehicle-Ready Package and Project Results," SAE International 2014-01-1191, Apr. 1, 2014, 12 pages.

Ferrey, Paul et al., "Potential of a Variable Compression Ratio Gasoline SI Engine with Very High Expansion Ratio and Variable Valve Actuation," SAE International 2014-01-1201, Apr. 1, 2014, 20 pages.

Glugla, Chris Paul, "Method and System for Pre-Ignition Control," U.S. Appl. No. 14/604,279, filed Jan. 23, 2015, 54 pages.

Glugla, Chris Paul, "Method and System for Engine Control," U.S. Appl. No. 14/923,900, filed Oct. 27, 2015, 41 pages.

Miller, Kenneth James et al., "Method and System for Engine Control," U.S. Appl. No. 15/146,687, filed May 4, 2016, 54 pages.

Leone, Thomas G. et al., "Method and System for Engine Control," U.S. Appl. No. 15/146,720, filed May 4, 2016, 62 pages.

Leone, Thomas G. et al., "Method and System for Hybrid Vehicle Control," U.S. Appl. No. 15/146,752, filed May 4, 2016, 46 pages.

Miller, Kenneth James et al., "Method and System for Engine Control," U.S. Appl. No. 15/146,784, filed May 4, 2016, 47 pages.

Miller, Kenneth James et al., "Method and System for Engine Control," U.S. Appl. No. 15/146,822, filed May 4, 2016, 47 pages.

* cited by examiner

METHOD AND SYSTEM FOR ENGINE CONTROL

FIELD

The present description relates generally to methods and systems for controlling fuel usage of an engine coupled with a continuously variable transmission (CVT).

BACKGROUND/SUMMARY

Engines may operate using a plurality of different fuels, which may be separately delivered, or delivered in varying ratios, depending on operating conditions. The different fuels may result in differing engine efficiencies at a given operating condition. For example, an engine may use a first fuel (e.g., ethanol) and a second fuel (e.g., gasoline), each with different knock suppression abilities, to reduce engine knock limitations while improving overall fuel economy. As such, there may be several reasons why different fuels available to the engine may different efficiencies at various engine running conditions. As one example, the available fuels may have different octane ratings which affects spark retard usage and engine efficiency at high loads (for example, when the different fuels are compressed natural gas versus gasoline, or E85 versus gasoline, or regular grade fuel versus premium grade fuel). As another example, different fuels may result in different engine pumping work (for example, when the different fuels include a gaseous fuel versus a liquid fuel, or a port injected fuel versus a direct injected fuel). As still another example, different fuels may result in different parasitic losses (such as when the fuels include a fuel delivered via high pressure direct injection versus a fuel delivered via low pressure port injection).

Engine control systems may select a fuel for injecting into cylinders from the multiple available fuels based on engine operating conditions, fuel availability, as well as fuel costs. One example approach is shown by Surnilla et al. in U.S. Pat. No. 7,703,435. Therein, fuel selection is based on fuel availability, engine temperature, and knock limits. Another example approach is shown by Williams et al. in US20140067540. Therein fuel selection is based on fuel costs in a geographical area of interest.

However the inventors herein have recognized potential issues with such approaches. As one example, the optimal fuel economy gain associated with adjusting fuel usage may not be realized due to the fixed gear ratio of the transmission. In particular, at a given driver demand, for a fuel selected for use in the engine, there may be an associated fixed engine speed and load range that meets the driver demand. An engine controller may transition to a more efficient or cost-effective fuel for the driver demand. However, upon changing fuels, there may be engine limitations experienced at the associated engine speed-load that may reduce the fuel economy benefit of the fuel transition. As an example, upon transitioning to a lower octane fuel, the engine may become more knock-limited at high loads. The fuel penalty associated with the knock mitigation may outweigh the fuel economy benefit of the fuel transition. As another example, upon transitioning to a fuel delivered via high-pressure direct injection, the engine may become more friction limited at low loads compared to a fuel delivered via low-pressure port injection. Another issue is that frequent changes in operator pedal demand may cause the engine load to move back and forth, leading to frequent switching between fuels. Excessive switches between fuels can degrade fuel economy due to losses incurred during transitions.

The inventors herein have recognized that the fuel economy benefits of a multi-fuel engine may be better leveraged through integration with a continuously variable transmission (CVT). In particular, the CVT may enable the engine speed and load to be adjusted while maintaining the more cost-effective and efficient fuel and while maintaining the power output of the engine. In one example, fuel economy may be improved by a method for a multi-fuel engine coupled to a CVT comprising, for a power level, comparing operating cost at a current fuel to operating cost at an alternate fuel with an adjusted engine speed-load; and in response to a higher than threshold improvement in the operating cost at the alternate fuel with the adjusted engine speed-load, transitioning to the alternate fuel and changing to the adjusted engine speed-load. In this way, an engine can be operated with a fuel that provides an improved fuel economy for a given driver demand without being excessively knock limited at higher loads. In addition, the need for frequent fuel switching can be reduced.

As one example, an engine may be configured as a bi-fuel engine that uses one of two fuels for propelling vehicle wheels via engine torque. The two fuels may have different octane ratings and may be delivered to the engine via distinct delivery systems. As one example, the two fuels may include a higher octane ethanol fuel that is delivered to an engine cylinder via direct injection and a lower octane gasoline fuel that is delivered to the engine cylinder via port injection. At any given driver demand, the controller may be configured to compare the fuel efficiency versus power for each available fuel, including a fuel the engine is currently operating on as well as an alternate available fuel. The effects of fuel octane and associated knock limits are included in the efficiency versus power information. The effects of parasitic losses (such as high pressure direct injection) are also included in the efficiency versus power information. Upon retrieving a cost of each fuel (such as via wireless communication with a server, or from the cloud), the efficiency may be divided by the cost to determine a "work per dollar" value for each fuel. Then, if the more cost efficient fuel (that is, the one that provides more work per dollar spent on fuel) is not the current fuel, the controller may predict if there are any limitations, such as knock limitations, associated with the corresponding engine speed-load. If so, the controller may further determine if the engine speed-load can be changed while maintaining usage of the cost efficient fuel and while maintaining the demanded engine power output, and any fuel penalties associated therewith. In other words, the controller may determine whether the optimum engine speed-load with the more cost efficient fuel is different from the current engine speed-load. If the engine speed-load can be changed while maintaining usage of the selected fuel with a net fuel economy improvement, the controller may proceed to operate with the selected fuel and shift to the optimum speed-load range for the selected fuel. Else, the engine may switch to operating with the other available fuel. As an example, upon transitioning to a lower octane fuel, for a given driver demand, the engine speed may increase while the engine load decreases. To address knock anticipated while using the lower octane fuel, an engine controller may actuate the CVT to increase the engine speed while decreasing the engine load so as to maintain the demanded engine power output while providing a net cost benefit. Likewise, when transitioning to a higher octane fuel, the engine speed may be lowered (from the previous engine speed for the lower octane fuel) while load is increased (as compared to the previous load for the lower octane fuel).

In this way, fuel economy benefits can be improved. The technical effect of integrating multi-fuel engine technology in a vehicle having a CVT transmission is that for a given driver demanded power, the benefits of the various fuels can be better leveraged. In particular, the engine speed and torque for a given driver demanded power can be adjusted to reduce knock limitations at higher loads and friction losses at lower loads, while accounting for changes in fuel properties. The technical effect of assessing the fuel economy benefit of switching fuels with the fuel penalty associated with operating at the engine speed-load profile corresponding to a selected fuel is that frequent fuel switching can be reduced. While operating the engine with the more efficient and cost-effective fuel, CVT adjustments can be used to extend engine operation with the more efficient and cost-effective fuel despite changes in driver or wheel torque demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
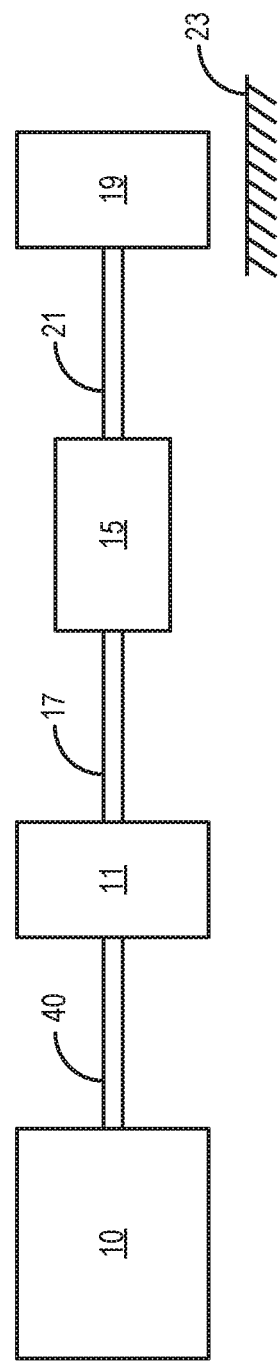
FIG. 1 illustrates an example vehicle powertrain.

The following description relates to systems and methods for improving fuel economy in a vehicle having a continuously variable transmission (herein also referred to as a CVT), such as the powertrain of FIG. 1. The powertrain may include an engine configured to operate on one or more of multiple fuels available on-board the vehicle, as described with reference to the engine system of FIG. 2. A controller may be configured to perform a control routine, such as the example routine of FIG. 3, to select a fuel for combusting in the engine while adjusting an engine speed-load profile at the selected fuel via adjustments to a speed ratio of the CVT to better leverage the fuel economy benefits of the multi-fuel engine. The controller may compare fuel island data maps for each fuel, such as the example maps of FIG. 5. An example map that may be used by the controller to select whether to maintain or transition between fuels is shown with reference to FIGS. 4 and 6. An example engine operation with fuel usage and CVT adjustments is shown at FIG. 7. In this way, multi-fuel technology can be integrated and synergized with CVT technology to achieve significant fuel economy improvements.

Figure 2:
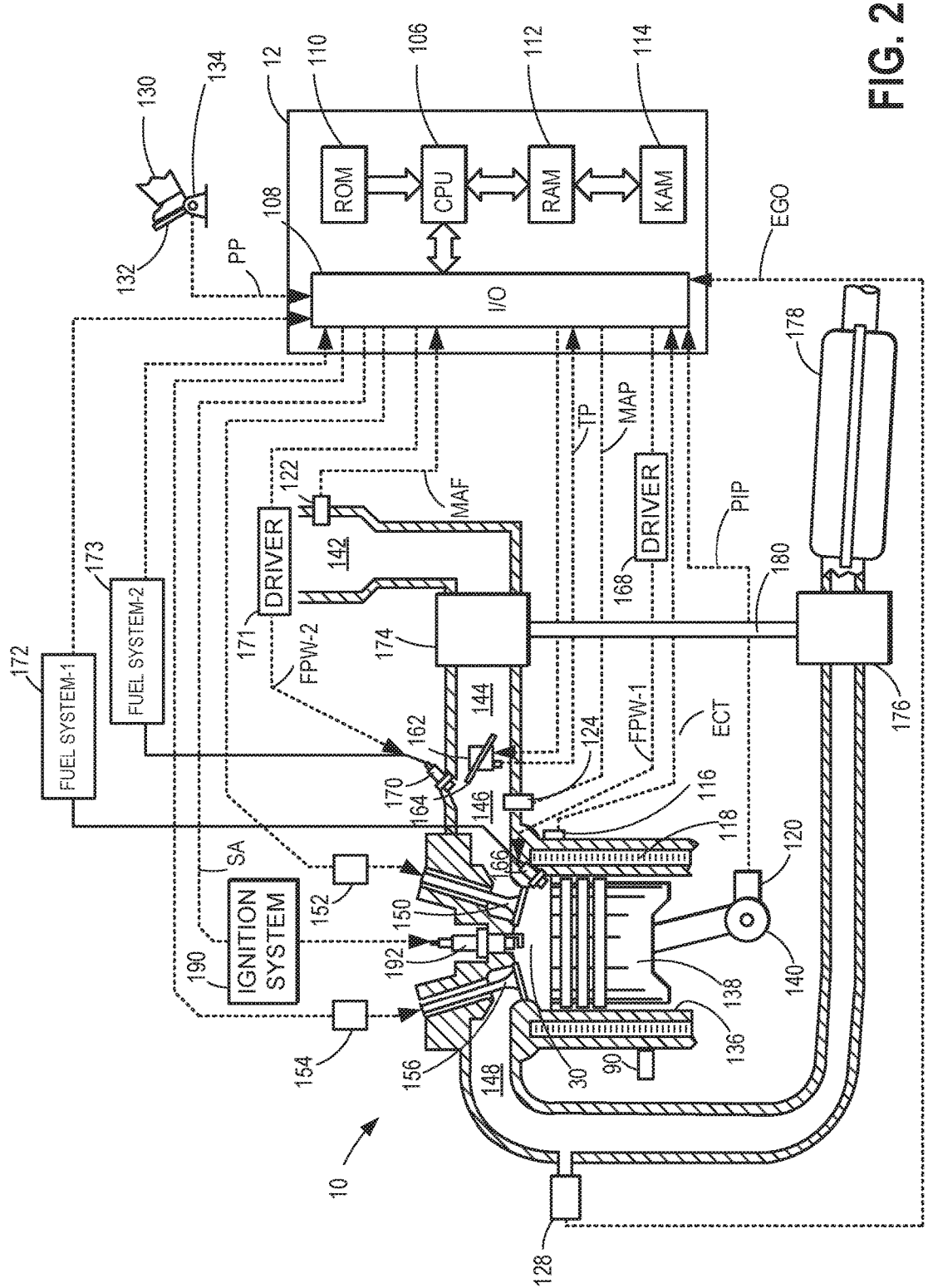
FIG. 2 shows a partial engine view.

Referring to FIG. 1, internal combustion engine 10, further described herein with particular reference to FIG. 2, is shown coupled to torque converter 11 via crankshaft 40. Engine may be a multi-fuel engine, such as a bi-fuel engine, configured to operate on one of a plurality of available fuels. Torque converter 11 is also coupled to transmission 15 via turbine shaft 17. In one embodiment, transmission 15 comprises an electronically controlled transmission with a plurality of selectable speed ratios. Transmission 15 may also comprises various other gears, such as, for example, a final drive ratio (not shown). In the depicted example, transmission 15 is a continuously variable transmission (CVT). The CVT may be an automatic transmission that can change seamlessly through a continuous range of effective speed ratios, in contrast with other mechanical transmissions that offer a finite number of fixed gear ratios (speed ratios). The speed ratio flexibility of the CVT allows the input shaft to maintain a more optimized angular velocity. As elaborated with reference to FIG. 3, by adjusting a speed ratio of the CVT, an engine controller may be configured to vary an engine speed-load profile while maintaining a demanded power output of the engine. For example, an engine speed may be lowered while an engine load is correspondingly increased to maintain a power output by adjusting the CVT to a lower speed ratio. As another example, an engine speed may be raised while an engine load is correspondingly decreased to maintain a power output by adjusting the CVT to a higher speed ratio. This enables fuel economy benefits of operating an engine with a selected fuel to be better leveraged.

Torque converter 11 has a bypass clutch (not shown) which can be engaged, disengaged, or partially engaged. When the clutch is either disengaged or being disengaged, the torque converter is said to be in an unlocked state. Turbine shaft 17 is also known as a transmission input shaft.

Transmission 15 may further be coupled to tire 19 via axle 21. Tire 19 interfaces the vehicle (not shown) to the road 23. Note that in one example embodiment, this power-train is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 depicts an example embodiment of a combustion chamber or cylinder of internal combustion engine 10. In one example, engine 10 may be coupled in a propulsion system (such as an on-road vehicle), such as with the powertrain of FIG. 1.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including two fuel injectors 166 and 170. Fuel injector 166 is shown coupled directly to cylinder 30 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the low volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 30, in a configuration that provides what is known as port injection of fuel (hereafter referred to as "PFI") into the intake port upstream of cylinder 30. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

In still other examples, a central fuel injector may be provided upstream of the port injector for injecting fuel via central fuel injection into the intake manifold.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Engine 10 may be configured as a multi-fuel engine (bi-fuel engine in the depicted example) where the engine may be operated using one or more of the available fuels. Fuel tanks in fuel systems 172 and 173 may hold fuel with different fuel qualities, such as different fuel compositions. These differences may include different alcohol content, different octane, different heats of vaporization, different fuel blends, different fuel volatilities, and/or combinations thereof etc. One example of fuels with different alcohol contents includes gasoline as a first fuel with a lower alcohol content and an ethanol fuel blend (such as E85) as a second fuel with a greater alcohol content. In another example, the engine may use ethanol fuel blends of varying alcohol content as the first and second fuel, such as E10 (which is approximately 10% ethanol and 90% gasoline) as the first fuel that is port injected and E85 (which is approximately 85% ethanol and 15% gasoline) as a second fuel that is direct injected. Other feasible substances include water, a mixture of alcohol and water, a mixture of alcohols etc. In alternate examples, the available fuels may vary in octane rating, composition, etc. As another example, fuels with different volatility include fuel of different alcohol content, or fuels of different seasonal or regional grades (e.g., a winter grade fuel and a summer grade fuel, or a northern grade fuel and a southern grade fuel). Additionally, the first and second fuels may also differ in other fuel qualities such as a difference in temperature, viscosity, octane number, etc. In still other examples, the different fuels may include a gaseous fuel (such as compressed natural gas which is stored as a liquid fuel but available as a gaseous fuel in the cylinder) and a liquid fuel (such as gasoline which is stored and available in the cylinder as a liquid fuel).

In the depicted embodiment, engine 10 is a multi-fuel engine system such that the fuel stored in fuel system-1 172 and delivered by fuel injector 166 is different from the fuel stored in fuel system-2 173 and delivered by fuel injector 170. As a non-limiting example, the first fuel delivered by port injection may be a first fuel having a lower alcohol content, while the second fuel delivered by direct injection may be a second fuel having a higher alcohol content. As elaborated below, the engine controller may adjust fuel injection profiles during an engine start, crank, and idle speed control to leverage the fuel properties of the different fuels available in the fuel system, as well as the benefits of port and direct injection to reduce exhaust gaseous and PM emissions.

Fuel may be delivered by both injectors to the cylinder during a single cycle of the cylinder. For example, each injector may deliver a portion of a total fuel injection that is combusted in cylinder 30. Further, the distribution and/or relative amount of fuel delivered from each injector may vary with operating conditions, such as engine speed, load, exhaust temperature, PM emissions, etc. The relative distribution of the total amount of first fuel port injected by injector 170 and the total amount of second fuel direct injected (as one or more injections) by direct injector 166 may be referred to as a first injection ratio. For example, injecting a larger amount of the first fuel for a combustion event via (port) injector 170 may be an example of a higher first ratio of port to direct injection, while injecting a larger amount of the second fuel for a combustion event via (direct) injector 166 may be a lower first ratio of port to direct injection. Note that these are merely examples of different injection ratios, and various other injection ratios may be used.

Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the intake stroke, multiple injections during the compression stroke, or a combination of some direct injections during the intake stroke and some during the compression stroke. When multiple direct injections are performed, the relative distribution of the total amount of second fuel directed injected between an intake stroke (direct) injection and a compression stroke (direct) injection may be referred to as a second injection ratio. For example, direct injecting a larger amount of the second fuel for a combustion event during an intake stroke may be an example of a higher second ratio of intake stroke direct injection, while injecting a larger amount of the second fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the intake stroke, compression stroke, or any appropriate combination thereof.

Figure 3:
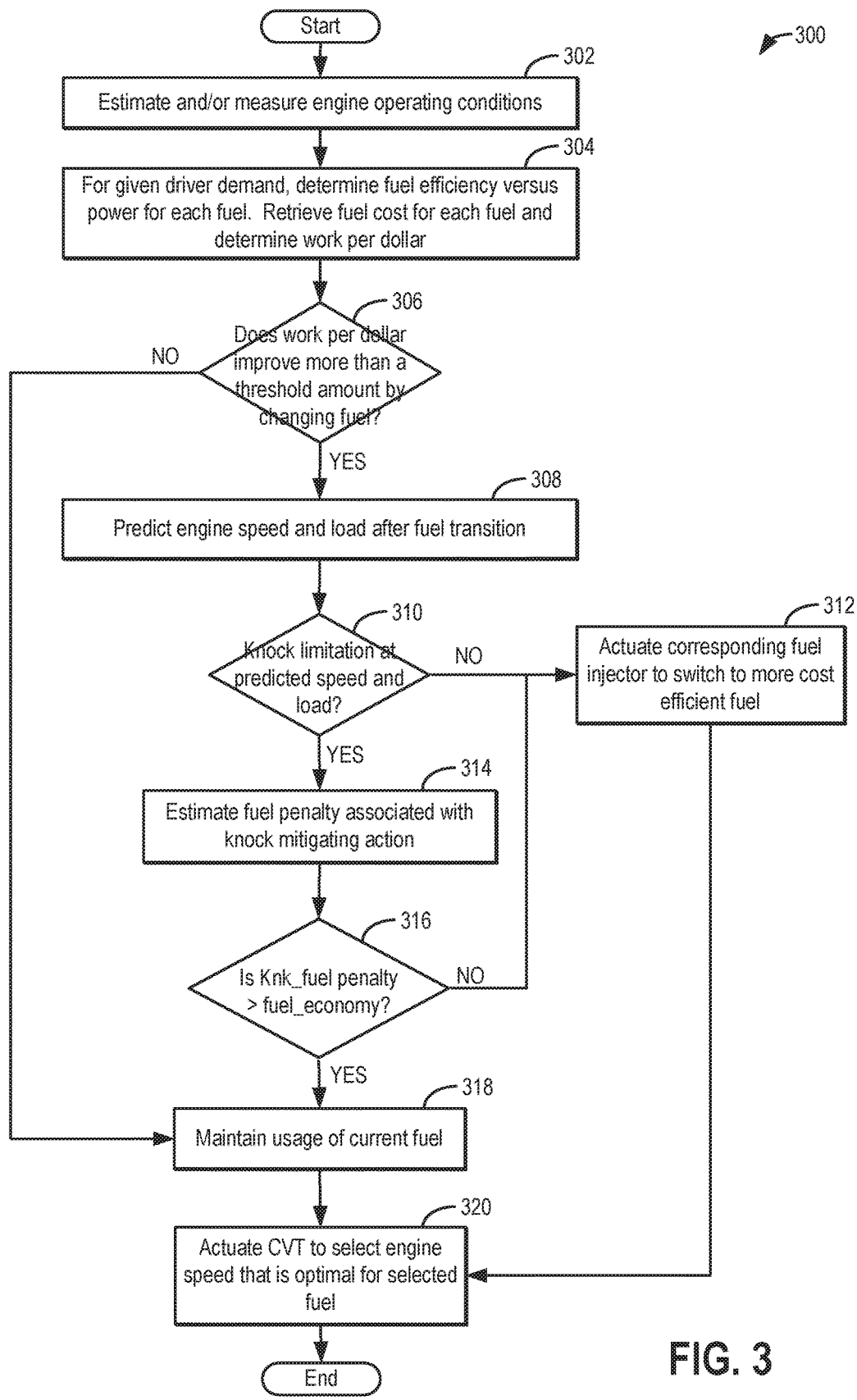
FIG. 3 shows a high level flow chart for selecting a fuel for use in the multi-fuel engine based on concurrent adjustments to an engine speed-load profile via a continuously variable transmission.

As elaborated with reference to FIG. 3, the controller may select a fuel for combustion in the cylinder responsive to a driver demand based on the efficiency of the fuel at the requested power level as well as the cost effectiveness of the fuel. In addition, the selection may take into account that the fuel efficiency can be improved by holding the engine in a speed-load range that is optimal for the given fuel, while maintaining a power level. By predicting knock limitations and associated cost penalties in the speed-load range optimal for each fuel, and taking those costs into account when selecting a fuel, use of a fuel in an efficient region can be extended despite frequent changes in driver demand. By reducing frequent fuel switching without compromising fuel economy and fuel costs, losses and issues associated with fuel switching can be reduced.

Engine 10 may further include a knock sensor 90 coupled to each cylinder 30 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. Further, the abnormal combustion may be accordingly addressed. For example, knock may be addressed by retarding spark timing or increasing delivery of a high octane fuel while pre-ignition is addressed by enriching the engine or limiting an engine load.

As described above, FIG. 2 shows only one cylinder of a multi-cylinder engine. As such each cylinder may similarly include its own set of intake/exhaust valves, fuel injector(s), spark plug, etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; knock sensor 90, and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. The controller 12 receives signals from the various sensors of FIGS. 1-2 and employs the various actuators of FIGS. 1-2 to adjust vehicle and engine operation based on the received signals and instructions stored on a memory of the controller. For example, adjusting fuel usage may include activating a fuel injector coupled to a fuel tank housing a selected fuel while deactivating a fuel injector coupled to a fuel tank housing a remaining fuel. An example routine that may be performed by the controller is described at FIG. 3.

In this way, the system of FIGS. 1-2 enables a vehicle system comprising: an engine with a cylinder; a first fuel injector for delivering a first fuel from a first fuel tank into the cylinder; a second fuel injector for delivering a second fuel from a second fuel tank into the cylinder, the second fuel having a different alcohol content than the first fuel; a continuously variable transmission (CVT) coupling the engine to vehicle wheels, the CVT having a plurality of speed ratios; and a controller. The controller may be configured with computer readable instructions stored on non-transitory memory for: estimating a first fuel economy associated with maintaining usage of the first fuel to a second fuel economy associated with transitioning to usage of the second fuel; if the second fuel economy is higher, predicting a fuel penalty associated with operating with a modified engine speed-load profile while using the second fuel; and if the fuel penalty adjusted second fuel economy is higher than the first fuel economy, activating the second fuel injector while deactivating the first fuel injector to transition to the second fuel while selecting one of the plurality of speed ratios of the CVT to provide the modified engine speed-load profile. Additionally, the controller may include further instructions for: if the first fuel economy is higher than the fuel penalty adjusted second fuel economy, maintaining the first fuel injector activated and the second fuel injector deactivated to maintain engine operation with the first fuel. In one example, the modified engine speed-load profile while using the second fuel is a first modified engine speed-load profile based on an engine knock limit and engine friction with the second fuel, wherein the controller includes further instructions for: while maintaining engine operation with the first fuel, predicting the fuel penalty associated with operating with a second modified engine speed-load profile at the first fuel, the second modified engine speed-load profile based on an engine knock limit and engine friction with the first fuel; if the fuel penalty is smaller, operating with the second modified engine speed-load profile with the first fuel; and if the fuel penalty is larger, maintaining a default engine speed-load profile with the first fuel. In one example, the selecting includes selecting a first lower speed ratio when the modified engine speed-load profile includes a higher engine speed and a lower engine load, and selecting a second higher ratio when the modified engine speed-load profile includes a lower engine speed and a higher engine load.

Now turning to FIG. 3, an example routine 300 is described for coordinating adjustments to selection of a fuel for use in a multi-fuel engine with adjustments to a speed ratio of a continuously variable transmission (CVT). In this way, a powertrain profile of the engine (including engine speed and load) can be adjusted while maintaining a demanded power output of the engine and while leveraging distinct fuel properties (such as octane rating and knock mitigating ability) fuel economy benefits from each of the VCR adjustment and the CVT adjustment. The method enables improvements in fuel economy despite frequent changes in driver power demand. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring engine operating conditions. These may include, for example, driver power demand (such as based on output of a pedal position sensor coupled to an operator pedal), ambient temperature, pressure and humidity, engine temperature, fuel level in a fuel tank, fuel octane of available fuel(s), manifold pressure (MAP), manifold air flow (MAF), catalyst temperature, intake temperature, boost level, etc.

At 304, the method includes, for the given driver power demand, comparing the cost efficiency of each fuel of the engine. For example, the cost efficiency of a current fuel (that the engine is operating on) may be compared to the cost efficiency of an alternate fuel (of which there may be one or more) available on-board the engine. The current fuel and the alternate fuel may vary in one or more of an octane rating, an alcohol content, and a delivery mechanism via which they are delivered into an engine cylinder. The various delivery mechanism options may include one of direct injection, port injection, and central injection. In one example, the current fuel may have a higher octane rating than the alternate fuel. In another example, the current fuel may have a lower octane rating than the alternate fuel.

As used herein, the cost efficiency for a given fuel may be defined as a ratio of energy or work generated by the given fuel relative to a monetary cost of using the given fuel. For example, for the given driver demand, the controller may first determine the fuel efficiency versus power (engine speed and load) for each available fuel, such as for a first fuel and a second fuel in a bi-fuel engine. In one example, the controller may compare the fuel efficiency of the two fuels by comparing the brake specific fuel consumption (BSFC)

of the engine for each fuel, and then compensate for fuel cost. The BSFC of the engine on each fuel may be stored in tables, maps, and/or equations as a function of operating conditions such as RPM, torque, temperature, humidity, inferred fuel octane, etc. In particular, for the driver demand, the controller may determine the BSFC of the first fuel and then determine the fuel efficiency as the inverse of the BSFC. Then the controller may determine an amount of the first fuel required, and calculate the cost of using the determined amount of first fuel. Then, the cost efficiency for the first fuel may be determined as the fuel efficiency of the first fuel divided by the cost of using the first fuel. Likewise for the second fuel, a fuel efficiency and cost of using the second fuel may be determined and the cost efficiency for the second fuel may be determined as the fuel efficiency of the second fuel divided by the cost of using the second fuel.

Figure 5:
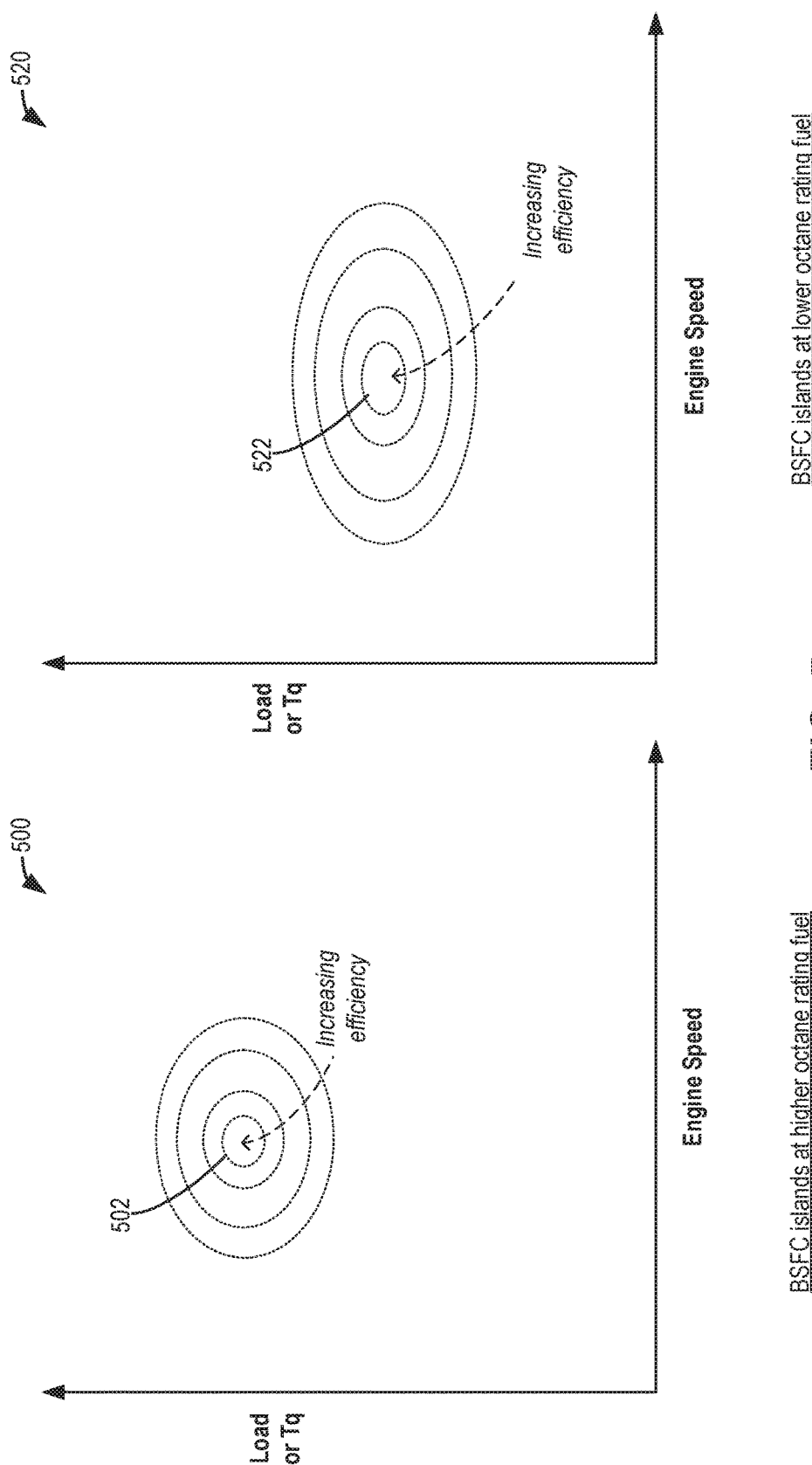
FIG. 5 shows example BSFC maps for an engine when operating with two different fuels.

In one example, the engine may be calibrated on each fuel to map out islands of constant BSFC. FIG. 5 depicts example BSFC maps with BSFC islands for an engine using two different fuels. In particular, map 500 depicts BSFC islands for a first, higher octane fuel (e.g., RON 98) that is direct injected into a boosted engine and map 520 depicts BSFC islands for a second, lower octane fuel (e.g., RON 91) that is direct injected into the boosted engine. The maps depict engine speed (in RPM) along the x-axis and engine load or torque or BMEP (in bar) along the y-axis. BSFC islands are then plotted based on engine speed relative to load (in g/kW-hr). As such, engine efficiency may be determined as the inverse of BSFC. Thus for any set of BSFC islands, the innermost island with the smallest area (island 502 and 522 for maps 500 and 520, respectively) represents an engine operating region with the highest efficiency, and therefore the lowest fuel consumption. In addition, BSFC for the engine remains constant over a given island.

As can be seen, relative to islands 502, 522, engine efficiency drops as engine speed decreases. This is due to hot gases in the cylinder losing heat to cylinder walls, the losses being more pronounced at lower engine speeds. Engine efficiency also drops as engine speed increases relative to islands 502, 522. This is due to increased frictional losses at higher engine speeds. Engine efficiency also drops as torque increases relative to islands 502, 522 even though friction accounts for a larger portion of useful engine work in this region. The drop in engine efficiency is due to the need to retard spark to address knock. Finally, engine efficiency drops as torque decreases relative to islands 502, 522 due to fixed overheads incurred in the operating of engine components such as oil pumps and water pumps. The pumping work and friction losses (e.g., due to mechanical friction) increase relative to the amount of work done, reducing efficiency.

In addition, as the octane rating increases, the size and position of the islands change. In particular, the island of best efficiency for a higher octane rated fuel (502) may move to a relatively higher engine speed and higher engine torque as compared to the island of best efficiency for a lower octane rated fuel (522). Also, the island of best efficiency for the higher octane fuel may encompass a smaller area spread uniformly over a range of engine speeds and torques (that is, essentially circular in shape) while the island of best efficiency for the lower octane fuel may encompass a larger area spread over a wider range of engine speeds as compared to the range of engine torques (that is, essentially horizontally oval in shape).

After comparing the fuel efficiencies, the controller may retrieve the fuel costs for each fuel. In one example, the fuel cost may be retrieved from a cloud server or an off-board server when the vehicle controller is configured with wireless communication. In another example, fuel costs may be stored in a look-up table in the controller's memory, the fuel costs stored as a function of geographical location. Upon retrieving the fuel cost for each fuel, the controller may divide the fuel cost by the efficiency to get an energy per dollar (or other currency unit) assessment, herein also referred to as the cost efficiency. In one example, the controller may use the following equation:

EnergyPerDollar=Fuel cost (in $/gallon)*fuel efficiency (in kW-hr/gram)*conversion constant.

In one example, a first fuel may cost more and a second fuel may cost less. Further, the efficiency of the first fuel may be higher such that a smaller amount of the first fuel is required to provide the same power as a larger amount of the second fuel. Herein if the effective (net) cost of using the smaller amount of more costly fuel is smaller than the effective cost of using the larger amount of less costly fuel, the EnergyPerDollar value of the first fuel may be higher than that for the second fuel. Else if the effective (net) cost of using the smaller amount of more costly fuel is larger than the effective cost of using the larger amount of less costly fuel, the EnergyPerDollar value of the second fuel may be higher than that for the first fuel.

At 306, the method includes determining if the cost efficiency of the engine improves by more than a threshold amount by changing the fuel usage from the current fuel the engine is in to another available fuel. For example, the engine may be currently operating on a first, lower octane fuel and in response to a change in the driver demand, it may be determined if the fuel efficiency of the engine improves by more than a threshold amount by transitioning to a second, higher octane fuel. In another example, the engine may be currently operating on a second, higher octane fuel and in response to a change in the driver demand, it may be determined if the fuel efficiency of the engine improves by more than a threshold amount by transitioning to the first, lower octane fuel. As such, the controller may select the fuel that provides the lower BFSC at the lowest cost as the more cost efficient fuel. In one example, the controller may use the fuel island maps for each fuel to pre-determine a line of optimal efficiency (calibrated as a function), as elaborated with reference to the example of FIG. 4.

If the cost efficiency of the engine does not improve by more than the threshold amount, then at 318, the method includes maintaining the current fuel usage in the engine. Herein, the fuel injector delivering the current fuel is maintained activated while the fuel injector delivering the alternate fuel is maintained deactivated. Optionally, CVT adjustments may be used to adjust the engine speed-load profile while using the current fuel to achieve additional fuel economy benefits. For example, if the current fuel is a lower octane fuel, the engine speed may be lowered while the engine load is raised to reduce friction losses at low loads while in the current fuel and while maintaining a demanded power level of the engine.

If the fuel efficiency of the engine improves by more than the threshold amount (based on the fuel efficiency comparison at 304), then at 308, the method includes predicting the engine speed and load after the fuel transition to the alternate fuel. In particular, to maintain the power output responsive to the driver demand, the fuel switch may result in a different engine speed-load profile. For example, for a given driver demand, the engine may provide the same power output by operating with a lower engine speed and higher engine load on the lower octane fuel or with a higher engine speed and lower engine load at the higher octane fuel.

At 310, it may be determined if any engine operating limitations are expected at the predicted engine speed-load for the more cost efficient fuel. These may include, for example, knock limitations, or frictional losses. For example, it may be determined if knock is likely to occur at the predicted engine speed-load.

If knock is not expected at the predicted engine speed-load, then at 312, the method includes transitioning the engine to the alternate fuel with the higher cost efficiency via activation of the corresponding fuel injector. Herein the controller may transition to the fuel providing the lower BFSC at the lowest cost. This includes the controller sending a signal to an actuator coupled to the fuel injector delivering the alternate fuel to the cylinder to active the injector. For example, the signal to the fuel injector may activate port injection of the alternate fuel. In another example, the signal to the fuel injector may activate direct injection of the alternate fuel.

For example, the engine may be a bi-fuel engine configured to operate with a first, lower octane fuel and a second, higher octane fuel, each fuel direct injected into the engine cylinder. When the lower octane fuel is the more cost efficient fuel, the controller may transition to the engine to the lower octane fuel (from the higher octane fuel). In another example, when the higher octane fuel is the more cost efficient fuel, the controller may transition the engine to the higher octane fuel (from the lower octane fuel).

The routine may then move to 320 wherein the controller adjusts the CVT to provide the engine speed-load profile that is optimal for the selected fuel. For example, the CVT may be adjusted to a lower speed ratio responsive to a transition to the lower octane fuel, thereby lowering the engine speed. As another example, the CVT may be adjusted to a higher speed ratio responsive to a transition to the higher octane fuel, thereby raising the engine speed.

In addition to actuating the CVT, the controller may also actuate one or more of the engine intake throttle, intake and/or exhaust cams, valve lift, boost pressure, and spark timing to deliver the optimal load (torque) for the selected fuel.

Returning to 310, if knock is expected at the predicted engine speed-load, then at 314, the method includes predicting a fuel penalty associated with a knock mitigating adjustment. For example, it may be determined if the engine speed-load profile can be modified (via adjustments to a speed ratio of the CVT) to reduce the knock. Adjusting to the adjusted/modified engine speed-load profile may include selecting a speed ratio of the CVT that matches the adjusted engine speed-load profile. This may include selecting a speed ratio that raises the engine speed while lowering the engine load while in the higher octane fuel to maintain the power output of the engine while reducing knock. In one example, the engine speed may be increased while the engine load is decreased as engine operation in the alternate fuel approaches the knock limit. As such, the inventors have recognized that the engine speed-load profile may be varied while maintaining the engine power output via adjustments to a speed ratio of the CVT. Then, the fuel efficiency of the engine in the new engine speed-load profile and the selected fuel may be calculated (in the present example, the fuel efficiency at the higher speed and lower load of the higher octane fuel).

In one example, the controller may refer a map, such as the example map of FIG. 4 (elaborated below) to determine if the change in engine speed-load results in transition of the engine from a first line (or island) of best cost efficiency to a second, different line (or island) of best cost efficiency, the second line having a lower cost efficiency as compared to the first line. Herein, a fuel penalty may be estimated based on a drop in the cost efficiency (e.g., based on a difference between the cost efficiency at the first line relative to the second line). With reference to the above-described example, a first cost efficiency of the engine at the higher octane fuel with the default lower engine speed and higher engine load may be compared to a second cost efficiency of the engine at the higher octane fuel with the CVT-adjusted higher engine speed and lower engine load. In an alternate example, an amount of spark retard required to mitigate the knock may be determined and the corresponding fuel penalty may be computed.

At 316, the predicted fuel penalty associated with knock (Knk_fuel penalty) may be compared to the fuel economy change associated with the transition to the selected fuel (Fuel_economy). In other words, a fuel economy associated with operating the engine at the current fuel is compared to the fuel economy change associated with operating the engine at alternate fuel with the modified engine speed-load profile. Herein, the engine may be operated at the current fuel with either a default engine speed-load profile for the current fuel or a modified speed-load profile modified based on engine limitations at the current fuel (which may be the same as or different from the engine limitations at the alternate fuel). Thus, the modified speed-load profile at the current fuel may be different from the modified speed-load profile at the alternate fuel. For example, the modified speed-load profile at the current fuel may be adjusted for friction losses while the modified speed-load profile at the alternate fuel may be adjusted for knock limitations. However, a power level of the engine is maintained at each of engine operation in the current fuel (with default or modified speed-load profile) and the engine operation in the alternate fuel with the modified/adjusted speed-load profile.

If the fuel penalty is lower than the fuel economy change due to the fuel transition, that is, the net result even with the change in engine speed-load profile and the fuel transition is a fuel benefit, then the method moves to 312 to transition the engine to the fuel with the higher fuel efficiency via adjustments to the corresponding injectors.

In addition, at 320, the controller may adjust the CVT to provide the engine speed-load profile that is optimal for the selected fuel and for addressing the given knock limitations. For example, the engine may be transitioned to the higher octane fuel while the CVT is adjusted to a speed ratio that raises the engine speed and lowers the engine load while maintaining the same engine powertrain output.

If the fuel penalty is higher than the fuel economy change due to a fuel transition, that is, the net result even with the change in engine speed-load profile and the fuel transition is a fuel loss, then the method moves to 318 to maintain the current fuel usage in the engine. Thus, even though the other fuel may be nominally more fuel efficient or cost efficient for the given driver demand, the controller may maintain the engine in the current fuel in view of fuel or cost inefficient limitations that may be experienced when operating at the other fuel. In addition, at 320, the controller may adjust the CVT to provide the engine speed-load profile that is optimal for the selected fuel. This may include maintaining a default engine speed-load profile for the current fuel while maintaining the current fuel usage. Alternatively, this may include adjusting the engine speed-load profile for the current fuel via adjustments to the CVT speed ratio while maintaining the current fuel usage.

It will be appreciated that while the above method discusses predicting knock limitations at the predicted engine speed-load at 310, and predicting a knock mitigating fuel penalty at 314, this is not meant to be limiting. In an alternate example, the controller may predict frictional losses at the predicted engine speed-load and then predict a friction mitigating fuel penalty. For example, when operating with a lower octane fuel at lower loads, friction may be traded for knock constraints. Thus, it may be more fuel efficient to transition the engine to the higher octane fuel while the CVT is adjusted to a speed ratio that lowers the engine speed and raises the engine load while maintaining the same engine power output.

Figure 4:
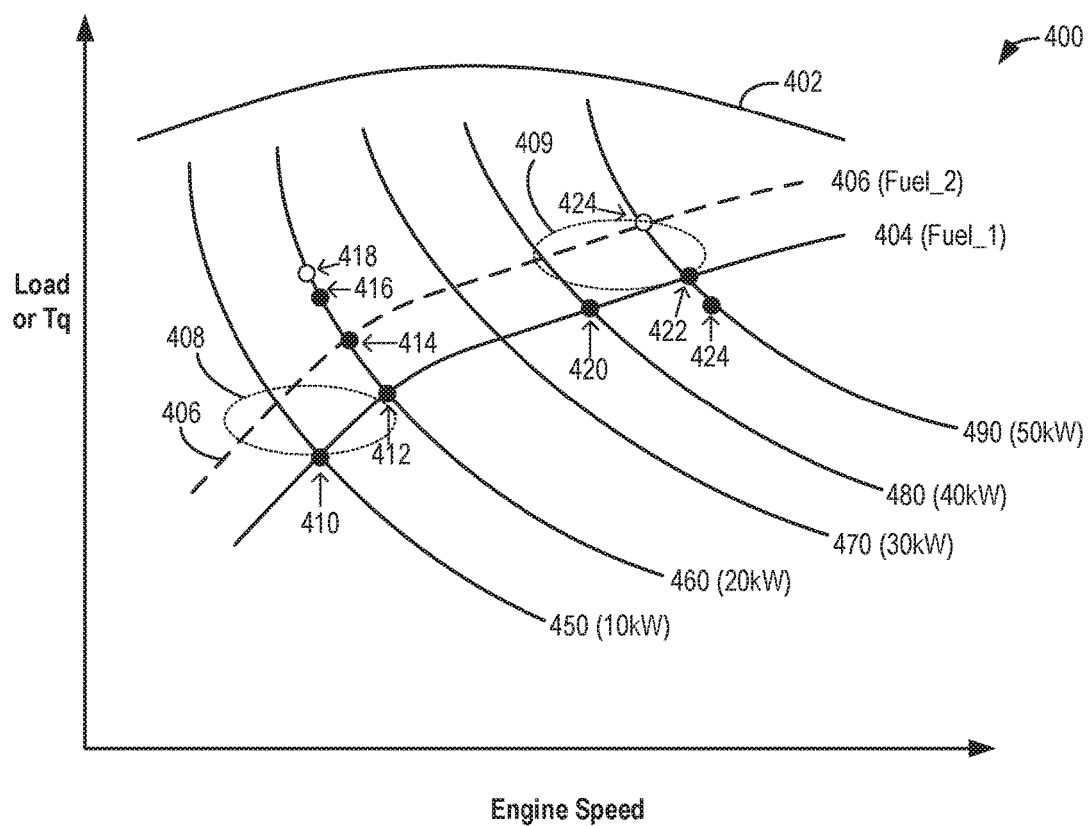
FIG. 4 shows an example map for selecting fuel usage.

In one example, as elaborated with reference to FIG. 4, the data from fuel island data maps for each fuel may be reduced to two best cost efficiency lines that the controller can more quickly interpolate between in real-time. Otherwise, the controller would have to run an optimization on each fuel map, and then try to further optimize a point in-between the two fuel states. In the present approach, the controller may for use fuel island maps and the fuel costs for each fuel to pre-determine a line of optimal efficiency. Then, for the current power demand, the controller may look up lines of optimal efficiency for a current operating power and evaluate the two curves to determine optimal efficiency. The controller may interpolate linearly between the line of optimal efficiency for the first fuel and the second fuel. Although the line may not be exactly linear, the changes may be small enough that a linear approximation may be a reasonable real-time approximation.

Turning now to FIG. 4, an example map 400 is shown for comparing fuel efficiencies associated with different fuels for a given driver demanded power output, as well as for comparing fuel efficiencies associated with different engine speed-load profiles for a given fuel. In one example, the map of FIG. 4 may be generated during engine calibration and stored in the engine controller's memory. The controller may then reference the map during engine operation to determine whether to maintain usage of a current fuel or transition to an alternate fuel responsive to a change in driver demand.

Map 400 depicts a first line of best efficiency versus power at a higher octane fuel, herein also referred to as a first fuel optimum-efficiency load limit 404 (depicted as a solid line). Map 400 also depicts a second line of best efficiency versus power at a lower octane fuel, herein also referred to as a second optimum-efficiency load limit 406 (depicted as a dashed line). The plots are shown with engine speed along the x-axis and engine load or torque along the y-axis. An example BSFC island (herein oval) of best fuel efficiency for the higher octane fuel is overlaid at dotted line 408, while a corresponding island for the lower octane fuel is overlaid at dotted line 409. It will be appreciated that islands 408 and 409 represent the innermost island of lowest fuel consumption and that fuel islands outer to this island are not shown herein for reasons of clarity. As such, the exact positions of the ovals of constant efficiency will change depending on current knock limits, which vary with fuel octane, temperature, humidity, and of course compression ratio. The maximum torque of the engine at a given engine speed is shown by curve 402. Lines of constant power output corresponding to 10 kW-50 kW are depicted at power lines 450-490, respectively.

A first fuel and CVT adjustment is shown with reference to operating points 410-416. Based on a current driver demand, the engine may be at operating point 410 on the engine speed-load map. In particular, based on the engine load corresponding to a position on (or just below) first optimum-efficiency load limit 404, and a power demand of 10 kW, the engine may be operating at operating point 410 with the higher octane fuel and with an engine speed/load along power line 450. The engine speed-load at the current fuel may be selected based on BSFC island 408.

If there is an increase in driver demand to 20 kW (such as due to an operator pedal tip-in while the engine is using the higher octane fuel), the engine may transition to operate along power line 460 and determine whether to stay using the higher octane fuel or transition to the lower octane fuel based on changes in fuel efficiency. As a first option, the engine could be moved to operating point 412 along power line 460. Herein, the driver demand is provided while maintaining the current higher octane fuel. As a second option, the engine could be moved to operating point 414 along power line 460 where the same power output is provided while transitioning to the lower octane fuel. As such, for the given driver demand, a higher fuel efficiency is provided at the lower octane fuel, due to the engine operating on an island of higher fuel efficiency at point 414. However, the controller may further determine that operating point 414 is associated with a limitation (e.g., a knock limitation) which can be addressed by moving, as a third option, to operating point 416 where engine load is increased and engine speed is decreased while staying on power line 460. The engine speed-load adjustment may be performed via adjustments to a speed ratio for the CVT. Moving to operating point 416 would result in a drop in fuel economy (that is, incur a fuel penalty) relative to staying at operating point 414. However, the fuel penalty associated with the transition from operating point 414 to operating point 416 is smaller than the fuel improvement associated with the transition from operating point 412 to operating point 414. Consequently, in response to the increase in driver demand, it is more fuel efficient to move from operating point 410 to 416 by transitioning to the lower octane fuel and decreasing the engine speed while lowering the engine load.

It will be appreciated that if the engine speed-load adjustment required to address the limitation moved the engine, as a fourth option, to operating point 418 (where the engine load is further increased and engine speed is further decreased while staying on power line 460), the move would incur a larger fuel penalty. In that case, the fuel penalty associated with the transition from operating point 414 to operating point 418 would be predicted to be larger than the fuel improvement associated with the transition from operating point 412 to operating point 414. Consequently, in response to the increase in driver demand, it would be more fuel efficient to move from operating point 410 to 414 by maintaining usage of the current (higher octane) fuel.

A second fuel and CVT adjustment is shown with reference to operating points 420-424. Based on a current driver demand, the engine may be at operating point 420 on the engine speed-load map. In particular, based on the engine load corresponding to a position on (or just below) first optimum-efficiency load limit 404, and a power demand of 40 kW, the engine may be operating at operating point 420 with the higher octane fuel and with an engine speed/load along power line 480. The engine speed-load at the current fuel may be selected based on BSFC island 409.

If there is an increase in driver demand to 50 kW (such as due to an operator pedal tip-in while the engine is operating with the higher octane fuel), the engine may transition to operate along power line 490 and determine whether to stay in the higher octane fuel or transition to the lower octane fuel based on changes in fuel efficiency. As a first option, the engine could be moved to operating point 422 along power line 490. Herein, the driver demand is provided while maintaining the current fuel. As a second option, the engine could be moved to operating point 424 along power line 490 where the same power output is provided while transitioning to the lower octane fuel. As such, for the given driver demand, a higher fuel efficiency is provided at the current fuel, as determined based on a comparison of their BSFC islands. Consequently, in response to the increase in driver demand, it is more fuel efficient to move from operating point 420 to 424 by maintaining usage of the current fuel. Additionally, further fuel economy benefits can be achieved via CVT adjustments while staying in the current fuel. Specifically, a speed ratio of the CVT can be adjusted to move the engine to operating point 426 along power line 490 where the same power output is provided while maintaining the current fuel by decreasing the engine load while increasing the engine speed.

In this way, for a given driver demand, an engine controller may estimate a first fuel economy associated with maintaining usage of a first fuel to a second fuel economy associated with transitioning to a second alternate fuel while operating with a knock-adjusted engine speed-load profile. If the second fuel economy is higher than the first fuel economy, the controller may determine that is more fuel and cost efficient to transition, and the controller may transition the engine to the second fuel. In addition, the controller may transition the engine to the knock-adjusted engine speed-load profile via adjustments to a speed ratio of the CVT. Herein, transitioning to the knock-adjusted engine speed-load profile includes transitioning from a default engine speed-load profile of the second fuel. In one example, the knock-adjusted engine speed-load profile includes a higher engine speed and a lower engine load as compared to the default engine speed-load profile for a given power level at the current fuel. In addition, an engine power output during engine operation at the first fuel is same as the engine power output during engine operation at the second fuel with the knock-adjusted engine speed-load profile. In comparison, if the second fuel economy is smaller than the first fuel economy, the controller may determine that it is not fuel efficient to transition, and the controller may maintain the first fuel usage. Additionally or optionally, the controller may transition to a friction-adjusted engine speed-load profile via adjustments to the speed ratio of the CVT while in the first fuel if the friction-adjusted engine speed-load profile provides even more fuel economy benefits (than staying in the first fuel with the default engine speed-load profile). In one example, where the second fuel is a higher octane fuel than the first fuel, the knock-adjusted engine speed-load profile at the second fuel includes a higher than default engine speed and a lower than default engine load, while the friction-adjusted engine speed-load profile at the first fuel includes a lower than default engine speed and a higher than default engine load.

Figure 6:
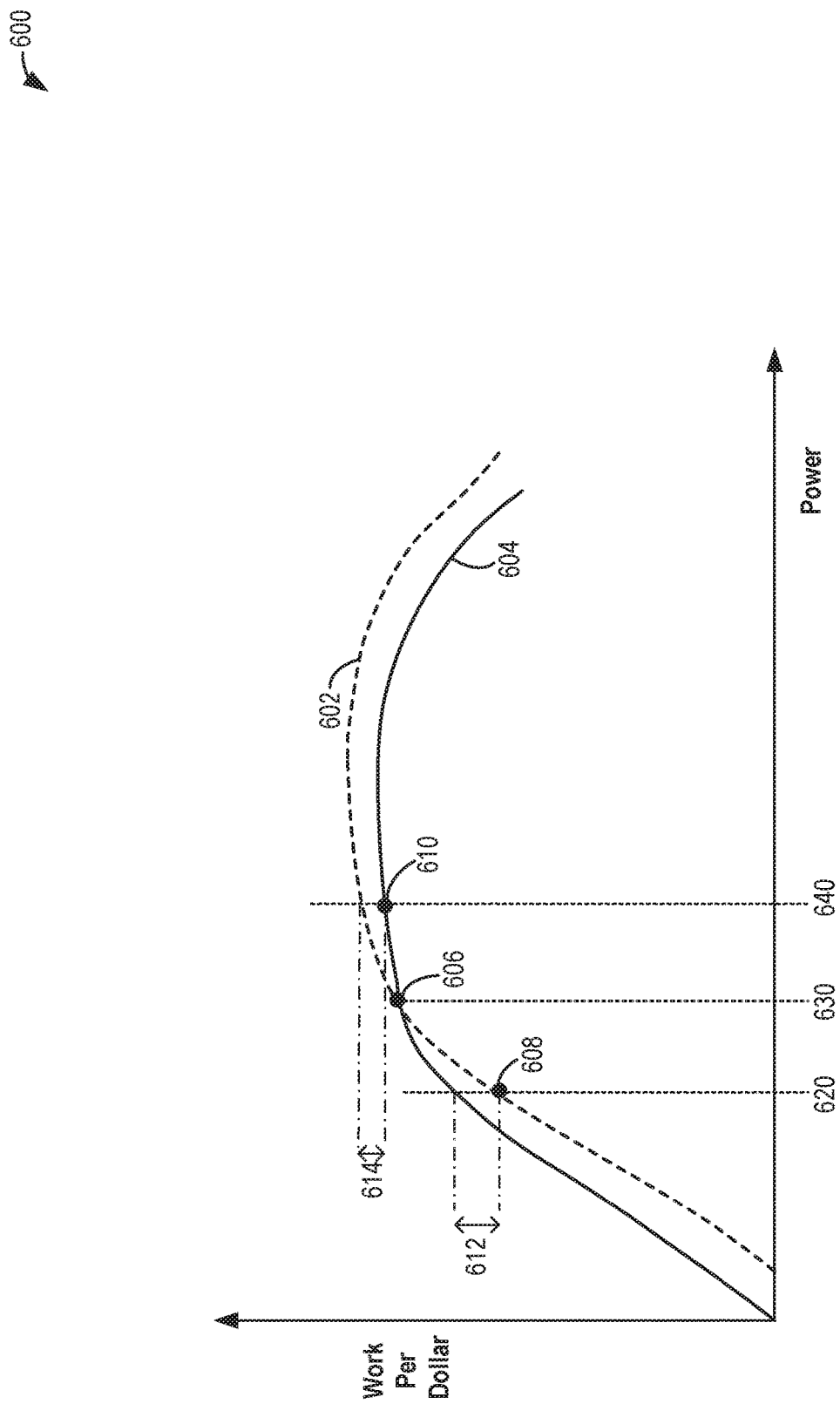
FIG. 6 shows another example map for selecting fuel usage.
Figure 7:
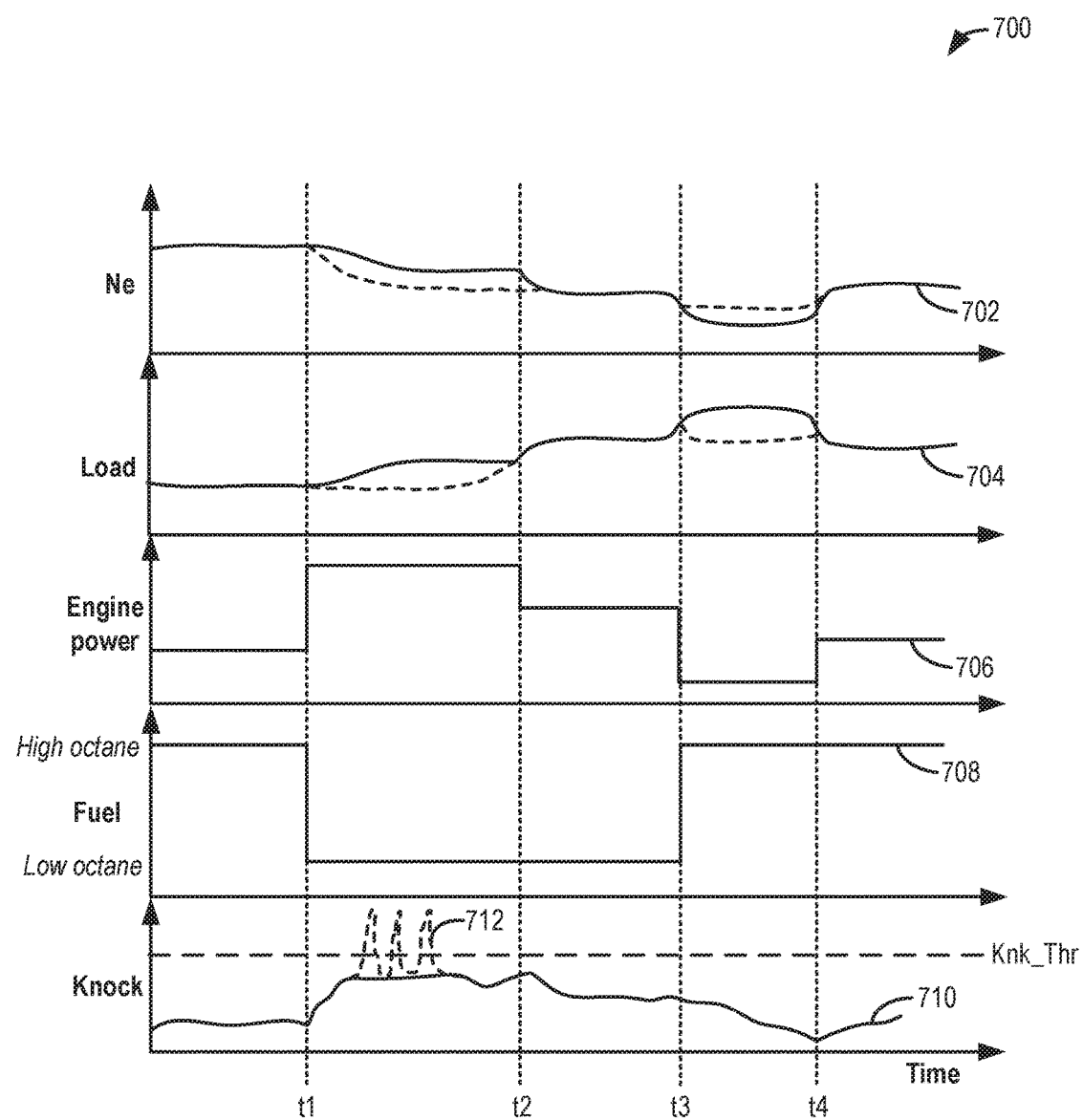
FIG. 7 shows example fuel usage and CVT adjustments during engine operation.

In another example, the controller may reference a map, such as the example map of FIG. 6 to identify the more cost and energy efficient fuel for use in the engine. With reference to FIG. 6, map 600 depicts a cost efficiency profile over a range of driver demand for each of a first and second fuel in a bi-fuel engine. Map 600 depicts power output along the x-axis and EnergyPerDollar (or work per dollar) values for each fuel along the y-axis. Plot 602 (dashed line) depicts the cost profile for a first higher-octane fuel while plot 604 (solid line) depicts the cost profile for a second lower-octane fuel. As depicted, for each fuel, as power increases, the cost efficiency rises, then plateaus, and then starts to drop.

The two plots intersect at operating point 606, which corresponds to power level 630. At this operating point, the efficiency and cost of operating with either fuel is equal. At power levels higher than level 630, the first higher-octane fuel is selected because it gives more work per dollar. At power levels lower than level 630, the second lower-octane fuel is selected because it gives more work per dollar. In one example, the engine may be using the first higher-octane fuel at operating point 606. In response to a drop in driver demand, such as responsive to a change from power level 630 to power level 620, the engine would not immediately switch to the second lower-octane fuel but would continue to operate with the first higher-octane fuel until the penalty in work per dollar reaches a threshold 612, as described in FIG. 3. While operating with the first higher-octane fuel, between power level 630 and power level 620 the work per dollar penalty is smaller and it may be minimized via CVT adjustments to optimize efficiency with the first higher-octane fuel. In this case CVT adjustments may include operating the engine at lower speed and higher torque while using the first higher-octane fuel.

In another example, the engine may be using the second lower-octane fuel at operating point 606. In response to a rise in driver demand, such as responsive to a change from power level 630 to power level 640, the engine would not immediately switch to the first higher-octane fuel but would continue to operate with the second lower-octane fuel until the penalty in work per dollar reaches a threshold 614, as described in FIG. 3. While operating with the second lower-octane fuel, between power level 630 and power level 640 the work per dollar penalty is smaller and it may be minimized via CVT adjustments to optimize efficiency with the second lower-octane fuel. In this case CVT adjustments may include operating the engine at higher speed and lower torque while using the second lower-octane fuel.

It will be appreciated that while the present example suggests two distinct fuel possibilities for the engine, in alternate examples, the engine may be operable on multiple fuels and the controller may similarly compare costs associated with and without CVT adjustments for each fuel before selecting a fuel for combustion in the engine cylinder. In addition, the controller may further select a combination of fuels for combustion in the engine cylinder.

Turning now to FIG. 7, example fuel usage adjustments coordinated with CVT adjustments are shown at map 700. Map 700 depicts changes to an engine speed at plot 702, engine load at plot 704, engine power at plot 706, fuel selection (between a first high octane fuel and a second low octane fuel at plot 708, and an indication of knock at plot 710. All plots are shown over time (along the x-axis). Significant timepoints during vehicle operation are shown at t1-t4. It will be appreciated that as used herein, the engine power is determined as a product of engine speed and engine load (or torque). In addition, the engine speed-load adjustments are achieved via adjustments a speed ratio of a CVT coupled between the engine and an output shaft. In the present example, the fuel usage is switchable between a first and a second fuel, although in alternate examples, additional fuels may be available and/or the fuel usage may be adjustable to any available fuel.

Prior to t1, the engine may be operating to provide a power output that is delivered via the depicted engine speed-load profile and with the engine using the higher octane fuel. At t1, in response to an increase in driver demand, the power output of the engine may be increased. Herein, the power output is increased by transitioning to the lower octane fuel due to the lower octane fuel being more cost efficient than the higher octane fuel. In addition, further fuel economy benefits are achieved by adjusting the engine speed-load profile in the lower octane fuel via CVT adjustments so that the same engine power is provided using a higher than default engine speed and a lower than default engine load. The default engine speed and load (for the given fuel) are depicted here as dashed lines. In particular, if the engine were maintained using the higher octane fuel and operated with the default engine speed-load, the engine would have been knock limited, as indicated by predicted knock sensor output 712 (dashed segment) exceeding the knock threshold (Knk_Thr). Herein, by transitioning to the higher engine speed and lower engine load via CVT adjustments while transitioning to the lower octane fuel, knock at higher loads is addressed while improving the overall engine fuel economy, and without compromising engine power output.

The engine may operate with the higher than default engine speed and lower than default engine load at the lower octane fuel for a duration until t2. At t2, in response to a drop in driver demand, the engine may be maintained in the lower octane fuel while resuming the default engine speed and default engine load due to the engine not being knock limited any more. This operation may be maintained until t3.

At t3, in response to a decrease in driver demand, the power output of the engine may be decreased. Herein, the power output is decreased by transitioning to the higher octane fuel due to the higher octane fuel being more fuel efficient than the lower octane fuel. In addition, further fuel economy benefits are achieved by adjusting the engine speed-load profile in the higher octane fuel via CVT adjustments so that the same engine power is provided using a lower than default engine speed and a higher than default engine load. The default engine speed and load (for the given fuel) are depicted here as dashed lines. In particular, if the engine were transitioned to the lower octane fuel and operated with the default engine speed-load, the engine could have been friction limited. Herein, by transitioning to the lower engine speed and higher engine load via CVT adjustments while transitioning to the higher octane fuel via VCR adjustments, friction losses at lower loads are reduced, while improving the overall engine fuel economy, and without compromising engine power output.

In this way, fuel efficiency of an engine can be improved by integrating multi-fuel engine technology with CVT technology. By leveraging the different engine speed-load combinations achievable for a given engine power output via CVT adjustments, an engine controller can more accurately address engine limitations, such as knock limitations associated with a particular fuel transition. As such, this allows the costs associated with a fuel transition to be more accurately determined, reducing the frequency of inefficient fuel switches responsive to frequent changes in operator or wheel torque demand. Overall, fuel economy of an engine can be enhanced.

One example method for a multi-fuel engine coupled with a continuously variable transmission (CVT) comprises: for a power level, comparing engine cost efficiency at a current fuel to engine cost efficiency at an alternate fuel with an adjusted engine speed-load; and in response to a higher than threshold improvement in the cost efficiency at the alternate fuel with the adjusted engine speed-load, transitioning to the alternate fuel and adjusting to the adjusted engine speed-load. In the preceding example, additionally or optionally, the method further comprises, in response to a lower than threshold improvement in the cost efficiency, maintaining the current fuel, wherein the cost efficiency for a given fuel is a ratio of energy generated by the given fuel relative to a monetary cost of using the given fuel. In any or all of the preceding examples, additionally or optionally, the method further comprises adjusting the engine speed-load while maintaining the current fuel, the adjusted engine speed-load with the current fuel different from the adjusted engine speed-load with the alternate fuel. In any or all of the preceding examples, additionally or optionally, the adjusted engine speed-load with the alternate fuel is based on a knock limit of the engine when operating with the alternate fuel and the adjusted engine speed-load with the current fuel is based on a knock limit of the engine when operating with the current fuel. In any or all of the preceding examples, additionally or optionally, adjusting to the adjusted engine speed-load includes increasing the engine speed while decreasing the engine load to maintain the power level as engine operation with the alternate fuel approaches the knock limit. In any or all of the preceding examples, additionally or optionally, adjusting to the adjusted engine speed-load includes decreasing the engine speed while increasing the engine load to maintain the power level as engine operation at the alternate fuel moves away from the knock limit. In any or all of the preceding examples, additionally or optionally, adjusting to the adjusted engine speed-load includes selecting a CVT speed ratio matching the adjusted engine speed-load. In any or all of the preceding examples, additionally or optionally, the power level is maintained at each of engine operation with the current fuel and engine operation with the alternate fuel with the adjusted engine speed-load. In any or all of the preceding examples, additionally or optionally, the power level is a powertrain output of the engine determined as a product of engine load and engine speed. In any or all of the preceding examples, additionally or optionally, the current fuel and the alternate fuel vary in one or more of an octane rating, an alcohol content, and a delivery mechanism via which they are delivered into an engine cylinder, wherein the delivery mechanism includes one of direct injection, port injection, and central fuel injection. In any or all of the preceding examples, additionally or optionally, the current fuel has a higher octane rating than the alternate fuel.

Another example method for an engine coupled with a continuously variable transmission (CVT), comprises: for a driver demand, estimating a first cost efficiency associated with maintaining a first fuel and a second cost efficiency associated with transitioning to a second fuel while operating with a knock-adjusted and friction-adjusted engine speed-load profile; and in response to the second cost efficiency being higher than the first cost efficiency, transitioning to usage of the second fuel and transitioning to the knock-adjusted and friction-adjusted engine speed-load profile via adjustments to a speed ratio of the CVT. In the preceding example, additionally or optionally, transitioning to the knock-adjusted and friction-adjusted engine speed-load profile includes transitioning from a default engine speed-load profile of the first fuel, and wherein an engine power output during engine operation with the first fuel is same as the engine power output during engine operation with the second fuel with the knock-adjusted and friction-adjusted engine speed-load profile. In any or all of the preceding examples, additionally or optionally, the method further comprises, in response to the second cost efficiency being smaller than the first fuel economy, maintaining usage of the first fuel and optionally transitioning to a knock-adjusted and friction-adjusted engine speed-load profile via adjustments to the speed ratio of the CVT. In any or all of the preceding examples, additionally or optionally, the second fuel has a higher octane rating than the first fuel, and wherein the knock-adjusted and friction-adjusted engine speed-load profile includes a higher than default engine speed and a lower than default engine load. In any or all of the preceding examples, additionally or optionally, the second fuel has a lower octane rating than the first fuel, and wherein the knock-adjusted and friction-adjusted engine speed-load profile includes a lower than default engine speed and a higher than default engine load.

Another example vehicle system comprises: an engine with a cylinder; a first fuel injector for delivering a first fuel from a first fuel tank into the cylinder; a second fuel injector for delivering a second fuel from a second fuel tank into the cylinder, the second fuel having a different alcohol content than the first fuel; a continuously variable transmission (CVT) coupling the engine to vehicle wheels, the CVT having a plurality of speed ratios; and a controller. The controller may be configured with computer readable instructions stored on non-transitory memory for: estimating a first cost efficiency associated with maintaining usage of the first fuel to a second cost efficiency associated with transitioning to usage of the second fuel; if the second cost efficiency is higher, predicting a fuel penalty associated with operating with a modified engine speed-load profile while using the second fuel; and if the fuel penalty adjusted second fuel economy is higher than the first fuel economy, activating the second fuel injector while deactivating the first fuel injector to transition to the second fuel while selecting one of the plurality of speed ratios of the CVT to provide the modified engine speed-load profile. In any or all of the preceding examples, additionally or optionally, the controller includes further instructions for: if the first cost efficiency is higher than the fuel penalty adjusted second cost efficiency, maintaining the first fuel injector activated and the second fuel injector deactivated to maintain engine operation with the first fuel. In any or all of the preceding examples, additionally or optionally, the modified engine speed-load profile while using the second fuel is a first modified engine speed-load profile based on an engine knock limit and engine friction with the second fuel, wherein the controller includes further instructions for: while maintaining engine operation with the first fuel, predicting the fuel penalty associated with operating with a second modified engine speed-load profile at the first fuel, the second modified engine speed-load profile based on an engine knock limit and engine friction with the first fuel; if the fuel penalty is smaller, operating with the second modified engine speed-load profile with the first fuel; and if the fuel penalty is larger, maintaining a default engine speed-load profile with the first fuel. In any or all of the preceding examples, additionally or optionally, the selecting includes selecting a first lower speed ratio when the modified engine speed-load profile includes a higher engine speed and a lower engine load, and selecting a second higher ratio when the modified engine speed-load profile includes a lower engine speed and a higher engine load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a multi-fuel engine coupled with a continuously variable transmission (CVT), comprising:
   for a power level, comparing engine cost efficiency with a current fuel to engine cost efficiency with an alternate fuel at an adjusted engine speed-load based on output of sensors of engine operating parameters; and
   in response to a higher than threshold improvement in the cost efficiency with the alternate fuel at the adjusted engine speed-load, transitioning to the alternate fuel via a controller sending a signal to an actuator coupled to a fuel injector delivering the alternate fuel to a cylinder to activate the fuel injector and changing to the adjusted engine speed-load.

2. The method of claim 1, further comprising, in response to a lower than threshold improvement in the cost efficiency, maintaining the current fuel, wherein the cost efficiency for a given fuel is a ratio of work generated by the given fuel relative to a monetary cost of using the given fuel.

3. The method of claim 2, further comprising adjusting the engine speed-load while maintaining the current fuel, the adjusted engine speed-load with the current fuel different from the adjusted engine speed-load with the alternate fuel.

4. The method of claim 1, wherein the adjusted engine speed-load with the alternate fuel is based on a knock limit of the engine when operating with the alternate fuel and wherein the adjusted engine speed-load with the current fuel is based on a knock limit of the engine when operating with the current fuel.

5. The method of claim 4, wherein changing to the adjusted engine speed-load includes increasing engine speed while decreasing engine load to maintain the power level as engine operation with the alternate fuel approaches the knock limit.

6. The method of claim 4, wherein changing to the adjusted engine speed-load includes decreasing engine speed while increasing engine load to maintain the power level as engine operation with the alternate fuel moves away from the knock limit.

7. The method of claim 1, wherein changing to the adjusted engine speed-load includes selecting a CVT speed ratio matching the adjusted engine speed-load.

8. The method of claim 1, wherein the power level is maintained at each of engine operation with the current fuel and engine operation with the alternate fuel with the adjusted engine speed-load.

9. The method of claim 1, wherein the power level is a powertrain output of the engine determined as a product of engine load and engine speed.

10. The method of claim 1, wherein the current fuel and the alternate fuel vary in one or more of an octane rating, an alcohol content, and a delivery mechanism via which they are delivered into an engine cylinder, wherein the delivery mechanism includes one of direct injection, port injection, and central injection.

11. The method of claim 10, wherein the current fuel has a higher octane rating than the alternate fuel.

12. A method for an engine coupled with a continuously variable transmission (CVT), comprising:
for a driver demand determined based on output of a pedal position sensor coupled to an operator pedal,
estimating a first cost efficiency associated with maintaining a first fuel and a second cost efficiency associated with transitioning to a second fuel while operating with a knock-adjusted and friction-adjusted engine speed-load profile; and
in response to the second cost efficiency being higher than the first cost efficiency, transitioning to usage of the second fuel via a controller sending a signal to an actuator coupled to a fuel injector delivering the second fuel to a cylinder to activate the fuel injector and transitioning to the knock-adjusted and friction-adjusted engine speed-load profile via adjustments to a speed ratio of the CVT.

13. The method of claim 12, wherein transitioning to the knock-adjusted and friction-adjusted engine speed-load profile includes transitioning from a default engine speed-load profile of the first fuel, and wherein an engine power output during engine operation with the first fuel is the same as an engine power output during engine operation with the second fuel with the knock-adjusted and friction-adjusted engine speed-load profile.

14. The method of claim 12, further comprising, in response to the second cost efficiency being smaller than the first cost efficiency, maintaining usage of the first fuel and optionally transitioning to the knock-adjusted and friction-adjusted engine speed-load profile via adjustments to the speed ratio of the CVT.

15. The method of claim 14, wherein the second fuel has a lower octane rating than the first fuel, and wherein the knock-adjusted and friction-adjusted engine speed-load profile includes a higher engine speed and a lower engine load compared to the first fuel.

16. The method of claim 14, wherein the second fuel has a higher octane rating than the first fuel, and wherein the knock-adjusted and friction-adjusted engine speed-load profile includes a lower engine speed and a higher engine load compared to the first fuel.

17. A vehicle system, comprising:
an engine with a cylinder;
a first fuel injector for delivering a first fuel from a first fuel tank into the cylinder;
a second fuel injector for delivering a second fuel from a second fuel tank into the cylinder, the second fuel having a different alcohol content than the first fuel;
a continuously variable transmission (CVT) coupling the engine to vehicle wheels, the CVT having a plurality of speed ratios; and
a controller with computer readable instructions stored on non-transitory memory for:
estimating a first cost efficiency associated with maintaining usage of the first fuel and a second cost efficiency associated with transitioning to usage of the second fuel; and
if the second cost efficiency with a modified engine speed-load profile is higher than the first cost efficiency, activating the second fuel injector while deactivating the first fuel injector to transition to the second fuel while selecting one of the plurality of speed ratios of the CVT to provide the modified engine speed-load profile.

18. The system of claim 17, wherein the controller includes further instructions for:
if the first cost efficiency is higher than the second cost efficiency, maintaining the first fuel injector activated and the second fuel injector deactivated to maintain engine operation with the first fuel.

19. The system of claim 17, wherein the modified engine speed-load profile while using the second fuel is a first modified engine speed-load profile based on an engine knock limit and engine friction when operating with the second fuel.

20. The system of claim 17, wherein the selecting includes selecting a first lower speed ratio of the CVT when the modified engine speed-load profile includes a higher engine speed and a lower engine load, and selecting a second higher ratio of the CVT when the modified engine speed-load profile includes a lower engine speed and a higher engine load.

* * * * *